UNITED STATES PATENT OFFICE.

WILLIAM E. CARSON, OF RIVERTON, VIRGINIA.

PROCESS OF MAKING A CEMENTITIOUS COMPOSITION.

1,095,180.  Specification of Letters Patent. Patented Apr. 28, 1914.

No Drawing.  Application filed April 5, 1911. Serial No. 619,132.

*To all whom it may concern:*

Be it known that I, WILLIAM E. CARSON, a citizen of the United States, residing at Riverton, in the county of Warren and State of Virginia, have invented certain new and useful Improvements in Processes of Making Cementitious Compositions, of which the following is a specification.

This invention relates to cementitious compositions and processes of making the same; and it comprises a method of making a cementitious plastic wherein an aluminous material, such as clay, is submitted to the simultaneous action of water, as water or as steam, and of quicklime to produce a mutual reaction, the mixture is thereafter dehydrated at a relatively low temperature, advantageously avoiding any sintering or clinkering heat and is thereafter recomminuted, and, if desired, rehydrated to a point short of setting; and it also comprises as a new article of manufacture a cementitious product comprising molecularly admixture and united clay or other aluminous material and lime in the form of a baked but not sintered aggregate, said aggregate on pulverization having cementitious and pozzuolanic properties; all as more fully hereinafter set forth and as claimed.

In its natural or plastic state, clay has no very good influence on the setting properties of cement, tending to "sicken" it and to retard and diminish its setting properties. When baked or dehydrated, however, clay has pozzuolanic properties, converting lime into a hydraulic cement. Much however depends on the heat which has been used in the baking, ordinary bricks, for example, giving material little adapted, however comminuted, for rendering lime hydraulic. Heating causes a profound change in clay, the first effect being to render it more susceptible to the action of chemicals while further heating renders it less susceptible. But however it may be heated, it is converted into a hard porous material which is, of course, insoluble in water and which is not readily broken up and suspended in water as is the original clay. It cannot be converted into mud with water as can natural plastic clay. Now when baked clay is comminuted and mixed with lime, practically the particles, whether granules or powder, can be attacked only on the surface by lime and water. In other words, its pozzuolanic action is limited, however careful the heating operation may have been. It is, furthermore, porous and weak. It is for this reason, probably, that modern cement makers in lieu of using a clayey material which had been heated, in admixture with lime as did the Romans (the Roman pozzuolana was a clay converted by volcanic heat) mix clay with lime and heat till the two begin to fuse and enter into chemical union. In other words, while with pozzuolana cement hydration and chemical action between lime and clay go on simultaneously, with modern Portland cement, chemical action is first effected and then hydration.

Clay is a substance which naturally possesses particles of indefinitely small size; any ordinary plastic clay is, as evinced by its ready suspension in water, an excessively fine grained material. The clay particles have naturally a state of subdivision which cannot be attained by any grinding process with baked clay. And these natural plastic clay particles enter readily into some sort of union with lime, chemical or physical, and probably both, resulting in a very intimate commixture.

I have found that by exposing a mixture of clay and water to the action of quicklime so that the slaking of the lime takes place in the presence of the clay I can produce a product which on subsequent baking forms an exceptionally useful material of the pozzuolanic type. The clay may be pugged with water to form an intimate and uniform mixture or mud, and this mixture then used for slaking quicklime. The water serves to subdivide the clay, separating the individual microscopic particles; and when the water clay mixture is used to slake quicklime, the lime enters into combination with the clay in a way impossible where the lime is previously hydrated; i. e., is exposed to water prior to contact with the clay. The reactions which occur during this hydration of the lime in the presence of clay are complex and not fully understood. Various forms of calcium aluminate are probably formed during this reaction however, and to these is probably largely due the quick setting properties of the final product. Fine ground lime may be admixed with fine ground clay and the mixture then treated with water. In either procedure, the lime is brought into contact with clay and with water simultaneously. Advantageously, the amount of water employed is merely that which will give a dry final product, and which will hydrate the mixture to a point short of setting. An advantageous proportion of water in pugging the clay with many clays, is about 35 per cent. of the weight of clay used. The amount of clay may be as desired, since any proportion, where there is enough lime to affect all the clay particles in this "hydration" treatment will give advantageous results. Ordinarily, the product of the present process will be used in admixture with lime or cement so that a small proportion of lime in such product may be sufficient. A relatively large amount of lime does no harm and is oftentimes desirable as conferring on the product self-disintegrating properties in the presence of moisture. Advantageously however the proportions of clay and lime are so adjusted as to give about 10 per cent. of alumina in the dehydrated product, though this proportion is merely typical and is by no means a rigid proportion.

After the hydration treatment, the mixture is next to be dried, if necessary because of the use of an excess of water, and then roasted, baked, or burned at a relatively low temperature; a temperature below the clinkering or sintering point where new relations would result between the component bodies. In other words this baking is practically only a dehydration, accompanied possibly by more or less further interaction between the constituents of the mixture. The lime having been used in the caustic state, no calcination in the sense of driving off carbon dioxid is necessary. A temperature of about 600° to 800° F. gives good results for the present purposes. At this range of temperatures, the lime treated clay loses most, or all, of its moisture and forms active pozzuolanic compounds without forming coarse-textured porous aggregates, as where clay is baked alone.

Any suitable heating means may be adopted. The material may be briqueted and baked or heated in an ordinary lime kiln. Or the pulverulent material may be sent down through an ordinary rotary inclined cement kiln in one or more sections and provided with heating means. The heating means should be readjusted however and the temperature should be kept much lower than that in the ordinary cement clinker operation since it is not desirable to fuse, frit, sinter or clinker the material and since there is no substantial calcination to be effected.

The baked or roasted material may be fine ground to 50 to 100 mesh, an operation requiring little power since the material is fine textured and since it has not been clinkered or fritted. It may be directly marketed in this form, or, and advantageously, it may be hydrated to a point short of setting and delivered in this form. Such a "short-hydrated" material is advantageous as being of uniform character and ready for admixture with cement or lime. In use, it may be employed for making plastics with lime or with cement; as, for instance, in making hard wall plaster. In admixture with lime it makes a pozzuolanic cement of fine texture because of the fineness of texture of the original materials. Where containing sufficient lime it may of course be used for cement purposes without further admixture with lime or cement. When mixed with sand it gives an excellent mortar.

Any ordinary plastic clay may be employed, but it is better that the clay be as free of sand as possible since this sand is inert for the present purposes, and since it makes the final grinding more expensive. High alumina clays such as kaolinite are particularly advantageous since the higher the amount of alumina, other things being equal, in the product the better it is for the present purposes. Bauxite itself may be used in lieu of clay; and the high alumina clays are all suitable. The presence of iron in the hydrated form in the clay or bauxite is not disadvantageous to the qualities of the present material save in so far as color is concerned. For such purposes as hard wall plasters where no finishing coat is to be used, of course light colored materials are ordinarily desirable. With a finishing coat, the color is of course immaterial. And for some purposes, ferric hydrate itself may be employed though it does not give as good and hard a cement as hydrated alumina or the clays. Slags may be employed but they require a prior grinding which is expensive. High-alumina slags, such as those made from some Cuban iron ores, may be used and give a good product; but of course require a fine initial grinding prior to mixing with the water and lime.

When for any reason it is desirable to diminish the rapidity with which the product sets, gypsum or other controlling material may be added in suitable quantity at any stage of the process. Or, and very conveniently, the water with which the clay is mixed may contain a small quantity of sulfuric acid, which with the added lime forms gypsum during the slaking operation, the gypsum so formed being thus uniformly distributed through the mixture.

What I claim is:—

1. The process of making a cementitious composition which comprises bringing quicklime into reaction with clay in the presence of water and roasting the product below the sintering temperature.

2. The process of making a cementitious composition which comprises pugging clay with water, slaking quicklime in the mixture and roasting the product at temperatures between the approximate limits of 600° and 800° F.

3. The process of making a cementitious composition which comprises pugging clay with a predetermined quantity of water, slaking fine-ground quicklime in the mixture and roasting the product at a temperature too low to cause substantial chemical change therein.

4. The process of making a cementitious composition which comprises pugging clay with water, slaking quicklime in the mixture, the amount of water employed being such as will result in a dry mix, and roasting the product below the sintering temperature.

5. The process of making a cementitious product which comprises bringing a hydrated material comprising alumina, into reaction with quicklime in the presence of water and roasting the product below the sintering temperature.

6. The process of making a cementitious product which comprises bringing a material comprising alumina into reaction with quicklime in the presence of moisture, and roasting the product below the sintering temperature.

7. The process of making a cementitious composition which comprises bringing quicklime, water and clay into reaction, roasting the product below the sintering temperature and fine-grinding.

8. The process of making a cementitious composition which comprises bringing quicklime, water and clay into reaction, roasting the product below the sintering temperature, fine-grinding and hydrating to a point short of setting.

9. The process of making a cementitious composition which comprises pugging clay with water, slaking quicklime in the mixture, roasting the product at temperatures between the approximate limits of 600° and 800° F. and fine grinding.

10. The process of making a cementitious composition which comprises pugging clay with a relatively small quantity of water, slaking fine ground quicklime in the mixture, roasting the product at a temperature too low to cause substantial chemical change therein, and fine grinding.

11. The process of making a cementitious composition which comprises pugging clay with water, slaking quicklime in the mixture, the amount of water employed being such as will result in a dry mix, roasting the resulting mix below the sintering temperature, and fine-grinding the roasted product.

12. The process of making a cementitious product which comprises bringing a hydrated material comprising alumina, into reaction with water and quicklime, roasting the product below the sintering temperature, and fine-grinding.

13. The process of making a cementitious product which comprises bringing a material comprising alumina into reaction with lime and moisture, roasting the resulting mixture below the sintering temperature, and fine grinding the roasted product.

In testimony whereof, I affix my signature in the presence of witnesses.

WILLIAM E. CARSON.

Witnesses:
Jos. W. CARSON,
CLAUDE A. STOKES.